(12) United States Patent
Alpay et al.

(10) Patent No.: US 8,217,302 B2
(45) Date of Patent: Jul. 10, 2012

(54) REDUCING BACK-REFLECTIONS IN LASER PROCESSING SYSTEMS

(75) Inventors: Mehmet E. Alpay, Portland, OR (US); Brian Johansen, Hillsboro, OR (US)

(73) Assignee: Electro Scientific Industries, Inc, Portland, OR (US)

(*) Notice: Subject to any disclaimer, the term of this patent is extended or adjusted under 35 U.S.C. 154(b) by 971 days.

(21) Appl. No.: 12/209,959

(22) Filed: Sep. 12, 2008

(65) Prior Publication Data
US 2009/0308852 A1 Dec. 17, 2009

Related U.S. Application Data

(60) Provisional application No. 61/073,254, filed on Jun. 17, 2008.

(51) Int. Cl.
*B23K 26/00* (2006.01)
*B23K 26/14* (2006.01)
(52) U.S. Cl. ............... 219/121.72; 219/121.67
(58) Field of Classification Search .. 219/121.6–121.82; 385/33
See application file for complete search history.

(56) References Cited

U.S. PATENT DOCUMENTS

| | | | |
|---|---|---|---|
| 4,676,592 A * | 6/1987 | Nishioka et al. | 385/117 |
| 5,796,880 A * | 8/1998 | Ford et al. | 385/1 |
| 5,815,278 A * | 9/1998 | Johnston et al. | 356/445 |
| 6,088,153 A | 7/2000 | Anthon et al. | |
| 6,292,604 B1 | 9/2001 | Cheng | |
| 6,792,193 B2 | 9/2004 | Maestle et al. | |
| 7,067,763 B2 * | 6/2006 | Schramm | 219/121.69 |
| 7,518,086 B2 * | 4/2009 | Norikane et al. | 219/121.61 |
| 2002/0076178 A1 * | 6/2002 | Klocek et al. | 385/106 |
| 2004/0223692 A1 | 11/2004 | Tallone et al. | |
| 2007/0139651 A1 | 6/2007 | Courville | |
| 2008/0272096 A1 | 11/2008 | Alpay et al. | |

OTHER PUBLICATIONS

Notification of Transmittal of The International Search Report and the Written Opinion of the International Searching Authority, or the Declaration dated Jan. 12, 2010, for PCT/US2009/047490, filing date Jun. 16, 2009.

* cited by examiner

*Primary Examiner* — Sang Paik
(74) *Attorney, Agent, or Firm* — Stoel Rives LLP

(57) ABSTRACT

Systems and methods reduce or prevent back-reflections in a laser processing system. A laser processing system includes a laser source to generate an incident laser beam, a laser beam output to direct the incident laser beam toward a work surface, and a lens to receive the incident laser beam along a first axis of propagation that is substantially perpendicular to the work surface. The lens includes a primary axis that is substantially parallel to, and offset from, the first axis of propagation. The lens is configured to focus the incident laser beam onto the work surface along a second axis of propagation that forms a non-perpendicular angle with the work surface such that at least a substantial portion of a reflected laser beam from the work surface does not return to the laser beam output.

17 Claims, 6 Drawing Sheets

REDUCING BACK-REFLECTIONS IN LASER PROCESSING SYSTEMS

RELATED APPLICATION

This application claims the benefit under 35 U.S.C. §119 (e) of U.S. Provisional Application No. 61/073,254, filed Jun. 17, 2008, which is hereby incorporated by reference herein in its entirety.

TECHNICAL FIELD

This disclosure relates to processing materials with lasers. In particular, this disclosure relates to reducing laser beam back-reflection.

BACKGROUND INFORMATION

Generally, certain lasers may be sensitive to optical feedback such as a laser beam reflected back to the laser from a work surface. For example, fiber lasers are typically very sensitive to back-reflections from a work surface. If such reflections are not properly blocked, e.g., if there is a return path for such reflections to couple back into an output fiber, it is possible that both the output fiber and gain fibers may be damaged. Further, a seed laser may be damaged in a high-power master oscillator fiber amplifier device by reflected light that is amplified on its way back to the seed laser. In many laser processing systems, such as laser micromachining systems, it is therefore desirable to prevent such back-reflections from finding a path back into the output fiber.

One solution for reducing or avoiding back-reflection in laser processing systems is to use a Faraday isolator, such as the isolators manufactured by Electro-Optics Technology, Inc. of Traverse City, Mich. Placing a Faraday isolator in the beam path after the output fiber blocks the back-reflections in free-space before they return to the output fiber. For example, FIG. 1 is a block diagram of a typical fiber laser processing system 100 that includes an output fiber 110, a collimator assembly 112, a Faraday isolator 114, and a focusing lens 116. The output fiber 110 directs a divergent laser beam 118 from a laser source (not shown) to the collimator assembly 112. The collimator assembly 112 collimates the divergent laser beam 118 to provide a collimated laser beam 120 to the Faraday isolator 114.

The Faraday isolator 114 allows the transmission of light in only one direction. The collimated laser beam 120 transmits through the Faraday isolator 114 to the focusing lens 116, which focuses the beam onto a work surface 122. Because the incident laser beam's path is perpendicular to the work surface 122, a reflected laser beam 123 (shown in dashed lines) travels along the same path as that of the incident laser beam 120, in the reverse direction, through the focusing lens 116 to the Faraday isolator 114. The Faraday isolator 114, however, prevents the reflected laser beam from continuing along the reverse path back to the output fiber 110.

If the laser beam 118 exiting the output fiber 118 is randomly polarized (as it often is), the Faraday isolator 114 is configured to be polarization insensitive. As shown in FIG. 1, for example, a polarization insensitive Faraday isolator 114 may include an input birefringent wedge 124, a Faraday rotator 126, and an output birefringent wedge 128. While such isolators are commercially available, they are usually quite bulky (especially when configured for use with high-power beams) and expensive.

Another approach to reduce or avoid back-reflections is to "tilt" the entire beam delivery subsystem with respect to the work surface 122 so that the angle of incidence of the beam hitting the work surface is not 90 degrees. For example, FIG. 2 is a block diagram of another typical fiber laser processing system 200 having a tilted beam delivery subsystem (e.g., the output fiber 110, the collimator assembly 112, and the focusing lens 116) such that the path of the incident laser beam 120 is non-perpendicular to the work surface 122.

As a consequence of tilting the beam delivery subsystem, the path of the reflected laser beam 123 from the work surface 122 is angularly separated from the path of the incident laser beam 120. A portion 210 of the reflected laser beam 123 may propagate back through the focusing lens 116 to the output fiber 110. However, the angular separation between the path of the incident laser beam 120 and the reflected laser beam 123 corresponds to a spatial separation which, in turn, substantially prevents the back-reflected beam 123 from coupling into the output fiber 110. The amount of spatial separation between the paths of the incident laser beam 120 and the reflected laser beam 123 is proportional to the focal length of the focusing lens 116 and the angular tilt (with respect to the work surface 122) of the beam delivery subsystem. Thus, the amount of spatial separation may be increased by increasing either the focal length, the angular tilt, or both the focal length and the angular tilt.

As discussed below, while tilting the entire beam delivery subsystem with respect to the work surface 122 reduces back-reflections, it also tilts the focal plane with respect to the work surface 122. This leads to variations in the spot size and fluence at the work surface 122. These variations deteriorate process performance.

SUMMARY OF THE DISCLOSURE

Disclosed systems and methods reduce or prevent back-reflections in a laser processing system. In one embodiment, a laser processing system includes a laser source to generate an incident laser beam, a laser beam output to direct the incident laser beam toward a work surface, and a lens to receive the incident laser beam along a first axis of propagation that is substantially perpendicular to the work surface. The lens includes a primary axis that is substantially parallel to, and offset from, the first axis of propagation. The lens is configured to focus the incident laser beam onto the work surface along a second axis of propagation that forms a non-perpendicular angle with the work surface such that at least a substantial portion of a reflected laser beam from the work surface does not return to the laser beam output.

In addition, or in another embodiment, the system also includes a beam-stop located between the laser beam output and the work surface to block another portion of the reflected laser beam from returning along a path to the laser beam output.

In addition, or in another embodiment, the system further includes a secondary beam positioner located between the laser beam output and the lens to scan the incident laser beam across the lens.

In another embodiment, a method includes generating an incident laser beam, propagating the incident laser beam along a first axis of propagation to a lens, and changing a path of the incident laser beam from the first axis of propagation to a second axis of propagation with the lens. The second axis of propagation forms a non-perpendicular angle with the work surface.

Additional aspects and advantages will be apparent from the following detailed description of preferred embodiments, which proceeds with reference to the accompanying drawings.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION OF PREFERRED EMBODIMENTS

Figure 1:
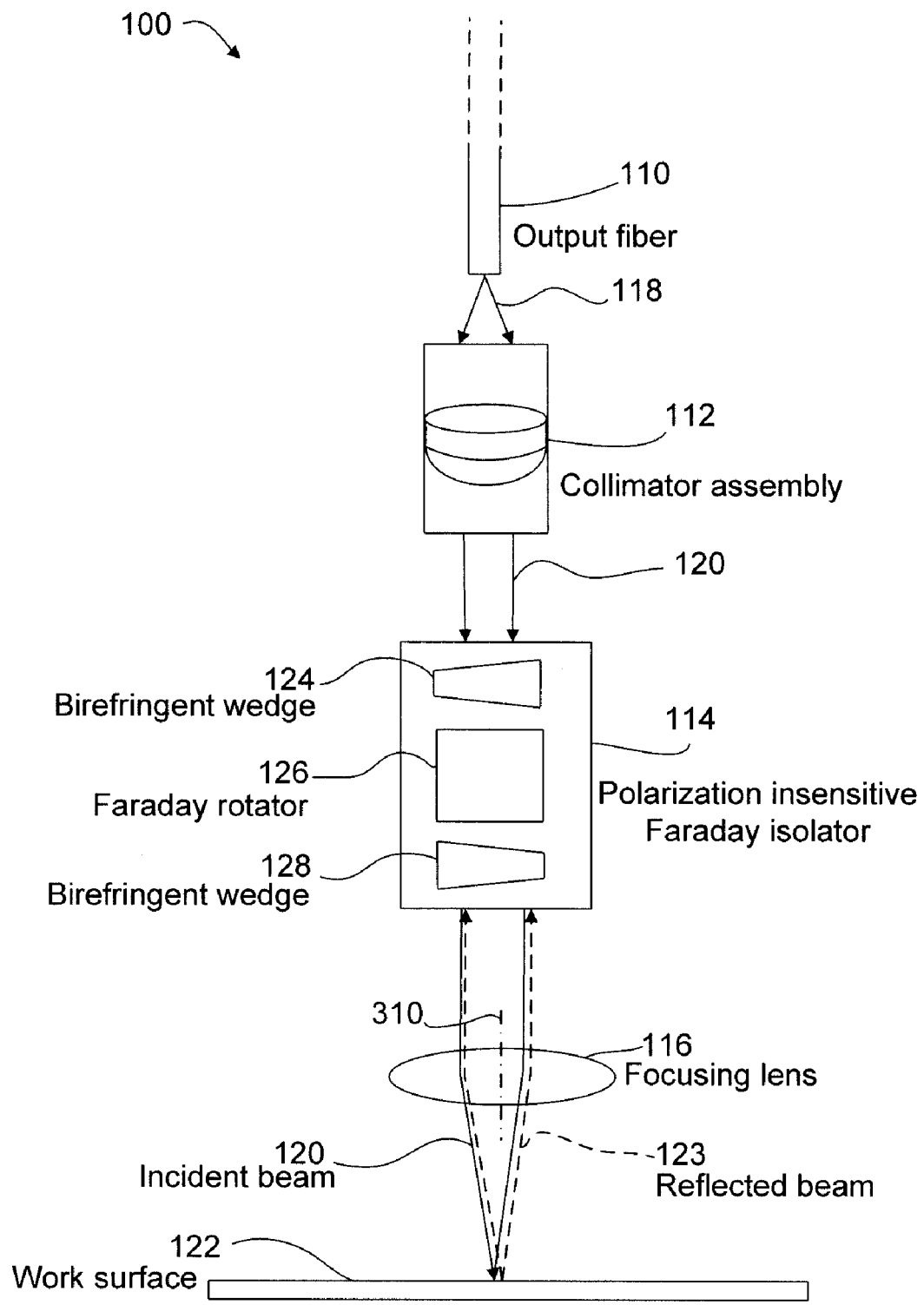
FIG. 1 is a block diagram of a typical fiber laser processing system that includes a Faraday isolator to reduce back-reflections.

Various systems and methods disclosed herein reduce or prevent back-reflections from coupling into an output fiber of a laser processing system without using bulky and/or expensive isolators. In one embodiment, a focusing lens is placed in the beam path at an offset distance from the beam propagation axis so as to impart a non-vertical "angle-of-attack" to the incident beam with respect to the work surface. This provides a spatial separation between incident and reflected beam paths without tilting the entire beam delivery subsystem with respect to the work surface. In one embodiment, an aperture further blocks the laser beam from reaching the output fiber. In addition, or in another embodiment, a secondary beam positioner scans an incident laser beam across the focusing lens at an offset from the focusing lens's primary axis such that a scanning focal plane is substantially parallel to the work surface.

Reference is now made to the figures in which like reference numerals refer to like elements. In the following description, numerous specific details are provided for a thorough understanding of the embodiments disclosed herein. However, those skilled in the art will recognize that the embodiments can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

Figure 2:
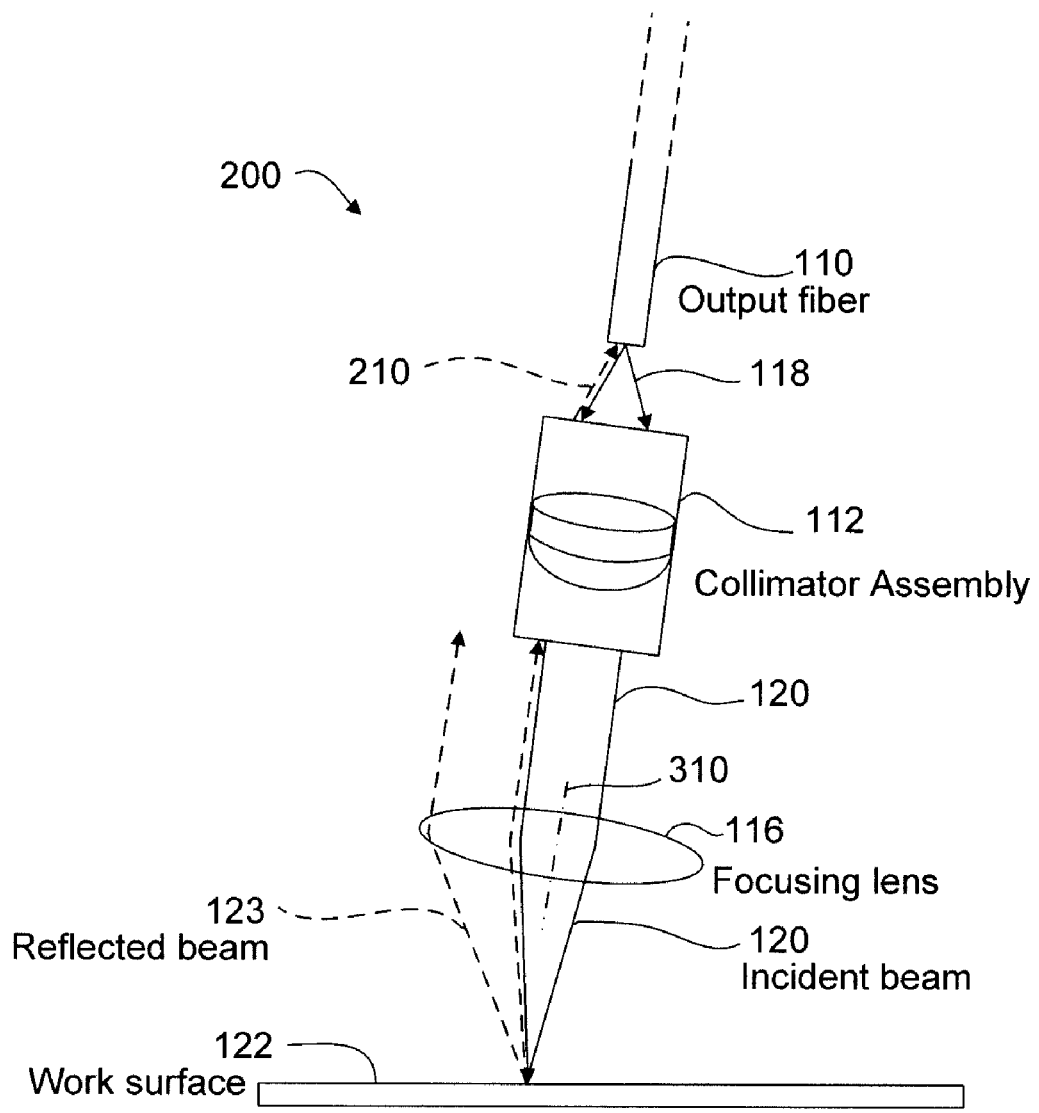
FIG. 2 is a block diagram of another typical fiber laser processing system having a tilted beam delivery subsystem to reduce back reflections.
Figure 3:
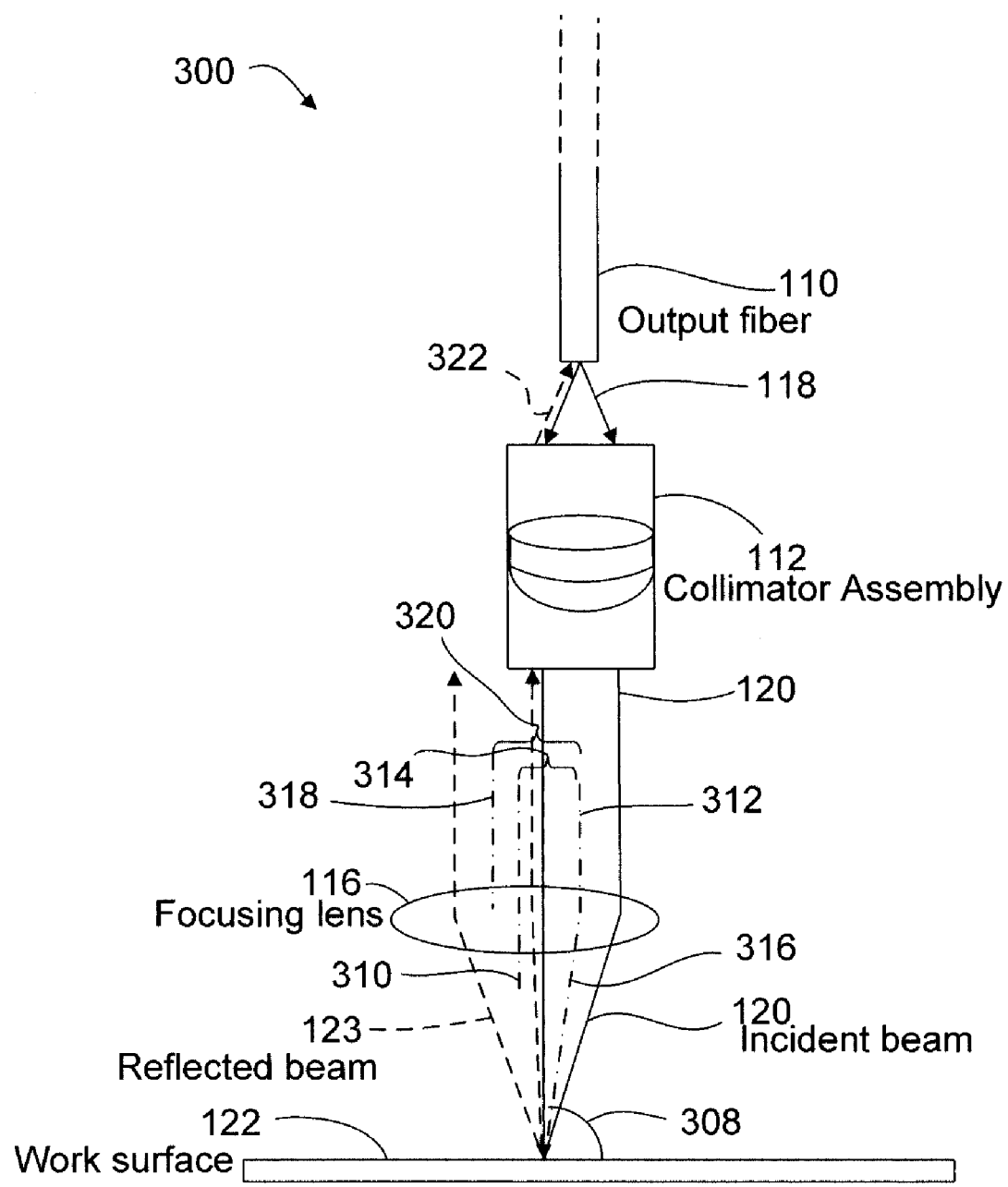
FIG. 3 is a block diagram of a laser processing system that reduces or substantially prevents back-reflections according to one embodiment.

FIG. 3 is a block diagram of a laser processing system 300 that reduces or substantially prevents back-reflections according to one embodiment. The system 300 creates a spatial separation between the paths of an incident laser beam 120 and a reflected laser beam 123 (shown in dashed lines) by providing the incident laser beam 120 on a work surface 122 at an angle 308 other than 90 degrees. This change in the incident beam's "angle of attack" 308 is not, however, achieved by tilting the beam delivery assembly, as discussed above with respect to FIG. 2.

The system 300 includes a fiber laser source (not shown) having an output fiber 110. In the examples disclosed herein, fiber-based lasers are discussed because such lasers are sensitive to back-reflections. An artisan will recognize from the disclosure herein, however, that other types of lasers may also be sensitive to back-reflections and that any type of laser source may be used. Accordingly, other types of lasers may have laser beam outputs other than the output fiber 110 discussed herein. Indeed, a laser beam output may include a combination of various optical elements used to guide a laser beam's path before the beam is focused onto a work surface 122.

The system 300 shown in FIG. 3 further includes a collimator assembly 112 and a focusing lens 116. The output fiber 110 directs a divergent laser beam 118 to the collimator assembly 112. The collimator assembly 112 collimates the divergent laser beam 118 such that the incident laser beam 120 on the focusing lens 116 is substantially collimated. The focusing lens 116 is a converging lens and is substantially symmetrical about its primary axis 310. The primary axis 310 of the focusing lens 116 is substantially perpendicular to the work surface 122.

The incident laser beam 120 propagates along a first axis of propagation 312 from the collimator assembly 112 to the focusing lens 116. The first axis of propagation 312 is substantially parallel to the primary axis 310 of the focusing lens 116. There is, however, an offset 314 between the first axis of propagation 312 of the incident laser beam 120 and the primary axis 310 of the focusing lens 116. In other words, the (collimated) incident laser beam 120 does not hit the focusing lens 116 at the center of the lens 116 (as in the standard layouts shown in FIGS. 1 and 2). Rather, the incident laser beam 120 hits the focusing lens 116 at an offset 314 from the center of the lens 116. In one embodiment, the amount of offset 314 is greater than or equal to approximately one-half the diameter of the collimated incident laser beam 120. As discussed below, such an amount of offset 314 reduces or prevents overlap between the reflected laser beam 123 and the incident laser beam 120.

The focusing lens 116 converges the incident laser beam 120 to a focused spot diameter on the work surface 122. As a result of the asymmetric arrangement provided by the offset 314 between the first axis of propagation 312 of the incident laser beam 120 and the primary axis 310 of the focusing lens 116, the focusing lens 116 "tilts" the incident laser beam 120 toward the primary axis 310 of the focusing lens 116. Thus, the focusing lens 116 changes the incident laser beam's path from the first axis of propagation 312 to a second axis of propagation 316 that intersects the work surface 122 at a non-perpendicular angle of attack 308.

As a consequence of using the offset 314 to tilt the incident laser beam 120, the path of the reflected laser beam 123 is angularly separated from the path of the incident laser beam 120. Thus, after returning through the focusing lens 116, the reflected laser beam 123 travels along a third axis of propagation 318 that is spatially separated from the first axis of propagation 312 of the incident laser beam 120. In certain embodiments, an offset 320 between the first axis of propagation 312 corresponding to the incident laser beam 120 and the third axis of propagation 318 corresponding to the reflected laser beam 123 is configured such that the reflected laser beam 123 does not overlap with the incident laser beam 120. Thus, all or at least a substantial portion of the reflected laser beam 123 does not return through the collimator assembly 118 to the output fiber 110.

As shown in FIG. 3, there may be situations in which a small portion 322 of the reflected laser beam 123 couples back into the output fiber 110. This may be undesirable in some embodiments. Thus, in certain such embodiments, a beam-stop is located anywhere between the output fiber 110 and the work surface 122 to prevent the remaining portion 322 of the reflected laser beam 123 from returning to the output fiber 110. For example, a mirror (not shown) may be place between the collimator assembly 118 and the focusing lens 116 to direct substantially all of the reflected laser beam 123 away from the collimator assembly 118 (e.g., to a beam dump). Such a mirror may be sized and positioned so as not to interfere with the collimated incident laser beam 120.

Figure 4:
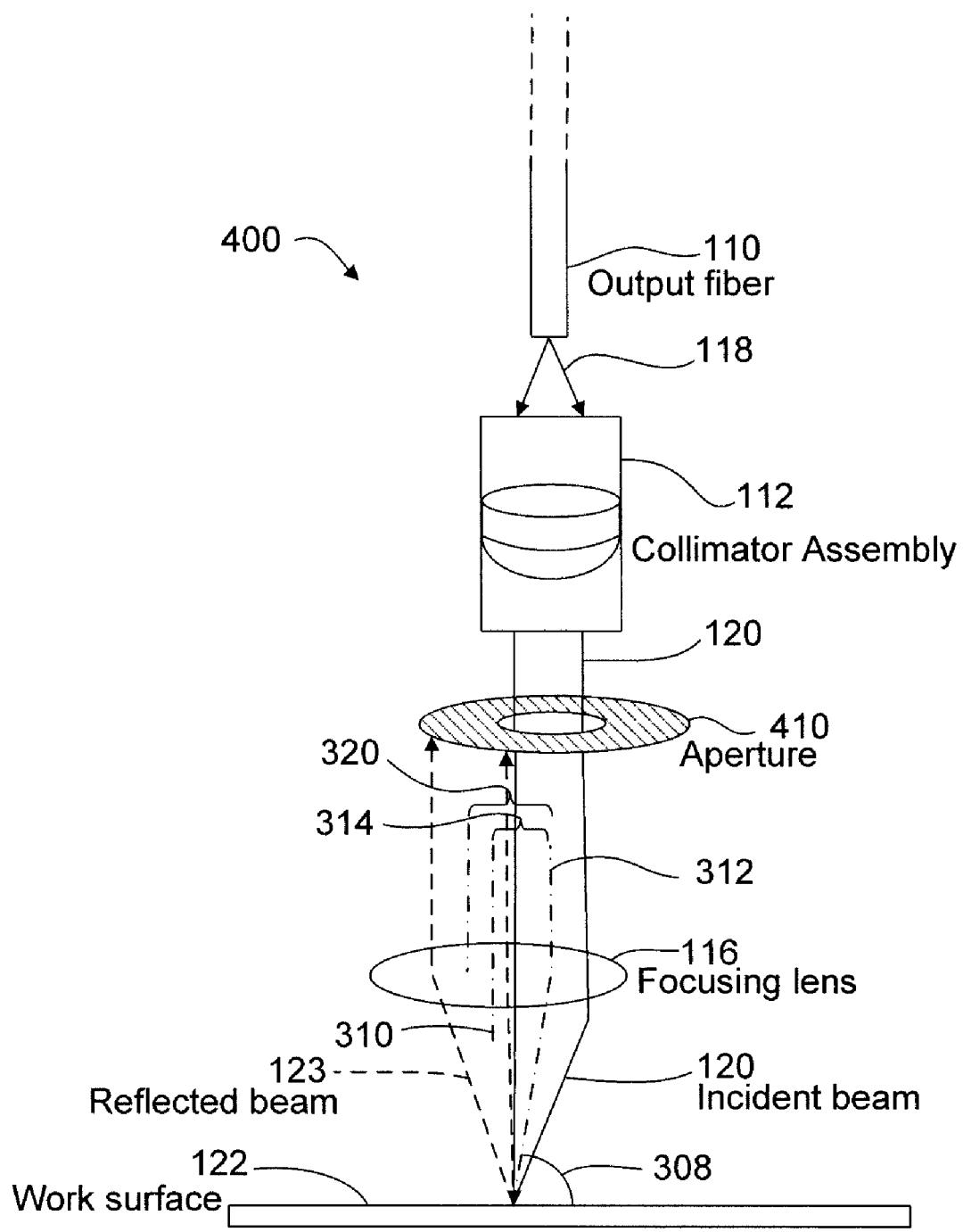
FIG. 4 is a block diagram of a laser processing system that includes an aperture that allows propagation of an incident laser beam and blocks the propagation of a reflected laser beam according to one embodiment.

Other devices may also be used as a beam-stop. For example, FIG. 4 is a block diagram of a laser processing system 400 that includes an aperture 410 that allows propagation of the incident laser beam 120 and blocks the propagation of the reflected laser beam 123 according to one embodiment. The aperture 410 has an opening that is substantially centered about the first axis of propagation of the incident laser beam 120. In one embodiment, the aperture 410 is greater than or substantially equal to the diameter of the (collimated) incident laser beam 120 so as to allow the incident laser beam 120 to pass from the collimator assembly 118 to the focusing lens 116.

In one embodiment, the system 400 is configured such that the spatial separation 320 between the paths of the incident laser beam 120 and the reflected laser beam 123 (as determined by the focal length of the focusing lens 116 and the amount of offset 314 between the first axis of propagation 312 of the incident laser beam 120 and the primary axis 310 of the lens 116) is in a range between approximately 1.5 times and 2.0 times the diameter of the collimated incident laser beam 120. Thus, by selecting the aperture 410 such that it has a comparable opening diameter to that of the incident laser beam 120, the likelihood of any significant back-reflections propagating to the output fiber 110 is substantially reduced.

Figure 5:
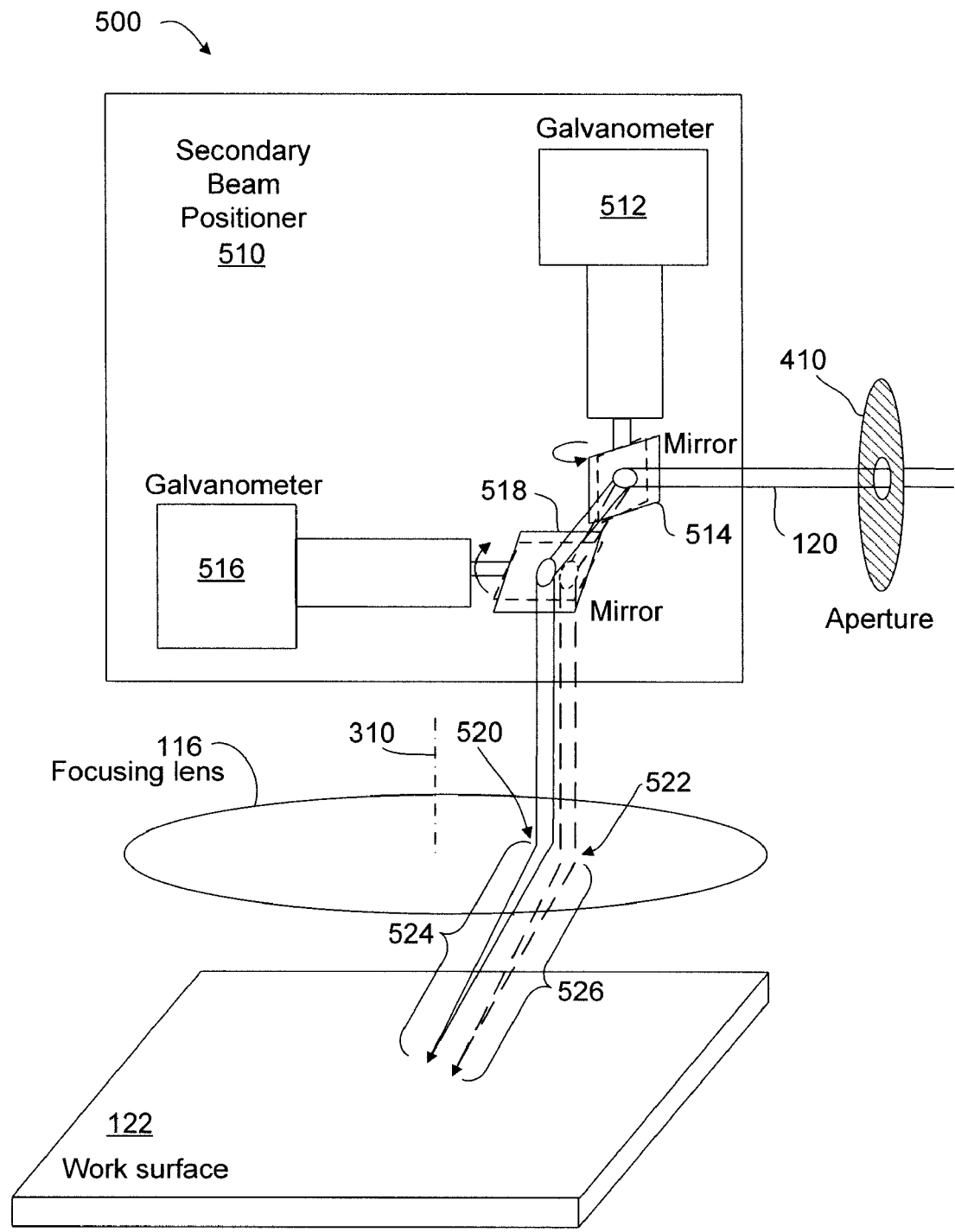
FIG. 5 is a block diagram of a laser processing system that includes a secondary beam positioner to scan the incident laser beam across the focus lens according to one embodiment.

In addition, or in another embodiment, the focusing lens 116 and/or the beam-stop (e.g., the aperture 410 shown in FIG. 4) is combined with a secondary beam positioner that is inserted at a location between the beam-stop and the focusing lens 116. For example, FIG. 5 is a block diagram of a laser processing system 500 that includes a secondary beam positioner 510 to scan the incident laser beam 120 across the focus lens 116 according to one embodiment. The secondary beam positioner 510 receives the collimated incident laser beam 120 (e.g., after it passes through the opening in the aperture 410) and steers the path of the incident laser beam 120 along the focusing lens 116 at an offset from the lens's primary axis 310.

In one embodiment, as shown in FIG. 5, the secondary positioning system 510 is configured to steer the incident laser beam 120 in two directions. A first galvanometer 512 adjusts a first mirror 514 to steer the incident laser beam 120 in a first direction, and a second galvanometer 516 adjusts a second mirror 518 to steer the incident laser beam 120 in a second direction. An artisan will recognize from the disclosure herein that other secondary beam positioner configurations may also be used.

Figure 6B:
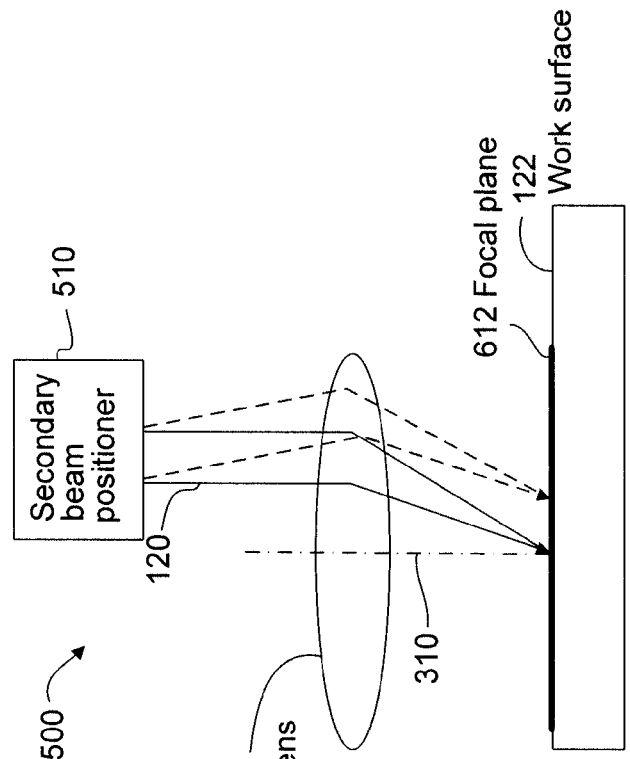
FIGS. 6A and 6B are block diagrams of respective laser processing systems that compare focal planes when using a secondary beam positioner according to certain embodiments.
Figure 6A:
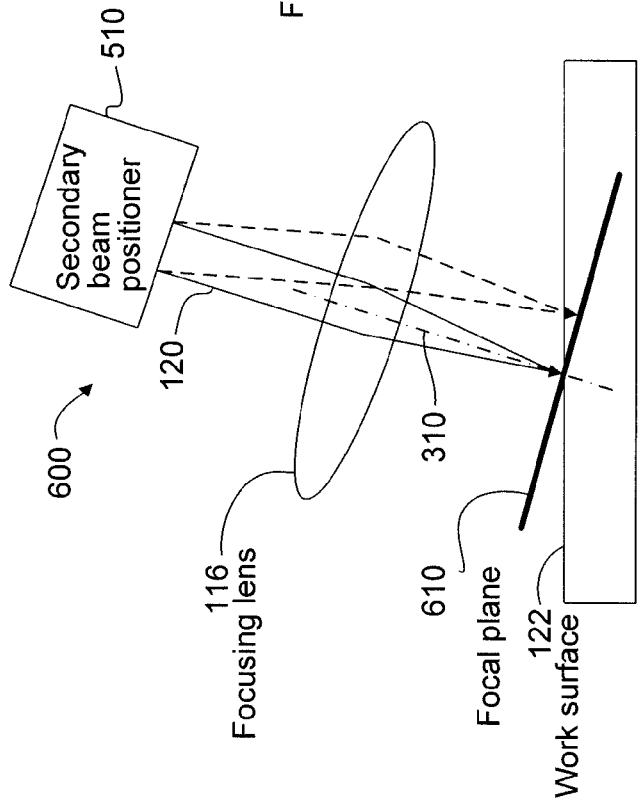

FIGS. 5, 6A, and 6B illustrate one of the advantages of the embodiments disclosed herein, as compared to the standard "tilted beam delivery assembly" approach shown in FIG. 2. Namely, in the disclosed embodiments, the beam path length from the focusing lens 116 to the point of impact on the work surface 122 remains substantially constant even as the secondary beam positioner 510 scans the incident laser beam 120 across the surface of the focusing lens 116. Referring to FIG. 5, as the secondary beam positioner 510 changes the path of the incident laser beam 120 from a first position 520 to a second position 522 with respect to the focusing lens 116, the length of the beam path 524 from the first position 520 to the work surface 122 remains substantially equal to the length of the beam path 526 from the second position 522 to the work surface 122. Note that in this example the path of the incident laser beam 120 from the first mirror 514, to the second mirror 518, through the second position 522 on the focusing lens 116, and to the work surface 122 is shown with a dashed line.

FIGS. 6A and 6B are block diagrams of respective laser processing systems that compare focal planes when using a secondary beam positioner 510 according to certain embodiments. FIG. 6A shows the beam positioner 510 used in a system 600 having a tilted beam delivery subsystem. In the embodiment shown in FIG. 6A, the primary axis 310 of the focusing lens 116 is non-perpendicular to the work surface 122. Thus, as the secondary beam positioner 510 scans the incident laser beam 120 through the primary axis 310 and other points along the focusing lens 116, the focal plane 610 shifts. The focal plane 610 shown in FIG. 6A is substantially perpendicular to the "tilted" primary axis 310 of the focusing lens 116. The ensuing variation in work surface spot size and fluence may deteriorate process performance.

This problem is reduced or avoided by the embodiments disclosed herein. For example, FIG. 6B illustrates a simplified version of the system 500 shown in FIG. 5, in which the primary axis 310 of the focusing lens 116 is substantially perpendicular to the work surface 122. Thus, as the secondary beam positioner 510 scans the incident laser beam 120 at one or more offsets along the focusing lens 116, the focal plane 612 remains substantially parallel to the work surface 122.

The disclosed embodiments are much simpler and cheaper to implement, as compared to the standard approach of inserting a Farday isolator 114 (see FIG. 1) into the beam path. The disclosed embodiments are also superior to the beam delivery assembly tilting approach (see FIG. 2) because they provide a constant beam path length from the focusing lens 116 to the work surface 122, even in the presence of a secondary beam positioner 510 that scans the incident laser beam 120 across the surface of the focusing lens 116.

While the systems and methods described herein address back-reflection problems associated with a fiber laser based system, those skilled in the art will recognize that the approach is just as valid for systems that utilize other types of lasers as well.

It will be understood by those having skill in the art that many changes may be made to the details of the above-described embodiments without departing from the underlying principles of the invention. The scope of the present invention should, therefore, be determined only by the following claims.

The invention claimed is:

1. A laser processing system that reduces or substantially prevents back-reflections, the system comprising:
   a laser source to generate an incident laser beam;
   a laser beam output to direct the incident laser beam toward a work surface;
   a lens to receive the incident laser beam along a first axis of propagation that is substantially perpendicular to the work surface,
      wherein the lens comprises a primary axis that is substantially parallel to, and offset from, the first axis of propagation, and wherein the lens is configured to focus the incident laser beam onto the work surface along a second axis of propagation that forms a non-perpendicular angle with the work surface such that at least a substantial portion of a reflected laser beam from the work surface does not return to the laser beam output; and a secondary beam positioner located between the laser beam output and the lens to scan the incident laser beam across the lens, wherein the secondary beam positioner maintains the offset between the primary axis of the lens and the first axis of propagation of the incident laser beam at greater than or equal to about one-half of the incident laser beam's diameter.

2. The system of claim 1, further comprising a beam-stop located between the laser beam output and the work surface to block another portion of the reflected laser beam from returning along a path to the laser beam output.

3. They system of claim 2, wherein the beam-stop is located between the laser beam output and the lens, wherein the beam-stop comprises an aperture substantially centered about the first axis of propagation of the incident laser beam, and wherein the aperture is greater than or substantially equal to the incident laser beam's diameter to allow the incident laser beam to pass from the laser beam output to the lens.

4. The system of claim 1, wherein the secondary beam positioner changes the path of the incident laser beam from a first position to a second position with respect to the lens, and wherein the path of the incident laser beam from the lens to the work surface remains substantially constant between the first position and the second position such that the focal plane is substantially parallel to the work surface.

5. The system of claim 1, wherein the secondary beam positioner comprises a pair of galvanometer-driven mirrors.

6. The system of claim 1, wherein the laser source comprises a fiber laser.

7. The system of claim 1, wherein the laser beam output comprises an optical fiber.

8. The system of claim 1, further comprising a collimator located between the laser beam output and the lens.

9. A method for processing a workpiece with a laser, the method comprising:
generating an incident laser beam;
propagating the incident laser beam along a first axis of propagation to a lens;
changing a path of the incident laser beam from the first axis of propagation to a second axis of propagation with the lens,
wherein the second axis of propagation forms a non-perpendicular angle with the work surface; and
scanning the incident laser beam across the lens,
wherein the scanning maintains an offset between a primary axis of the lens and the first axis of propagation of the incident laser beam at greater than or equal to about one-half of the incident laser beam's diameter.

10. The method of claim 9, wherein changing the path of the incident laser beam comprises locating the primary axis of the laser beam at the offset with the first axis of propagation.

11. The method of claim 9, further comprising blocking at least a portion of a reflected beam from propagating along the first axis of propagation.

12. The method of claim 11, further comprising passing the incident laser beam through an aperture centered about the first axis of propagation, the aperture being greater than or approximately equal to the incident laser beam's diameter.

13. The method of claim 9, wherein the scanning further comprises scanning the incident laser beam across the lens using a secondary beam positioner so as to maintain substantially equal beam path lengths between the lens and the work surface during the scan.

14. The method of claim 9, substantially collimating the incident laser beam as it propagates along the first axis of propagation.

15. A laser processing system comprising:
generating means for generating an incident laser beam;
output means for directing the incident laser beam toward a work surface;
focusing means for focusing the incident laser beam on the work surface, wherein the focusing means comprises a first axis of propagation that is substantially perpendicular to the work surface, and wherein a primary axis of the focusing means is offset from the first axis of propagation so as to redirect the incident laser beam from the first axis of propagation to a second axis of propagation that is non-perpendicular to the work surface; and
beam positioning means for scanning the incident laser beam across the focusing means so as to maintain an offset between the primary axis of the focusing means and the first axis of propagation of the incident laser beam at greater than or equal to about one-half of the incident laser beam's diameter.

16. The system of claim 15, further comprising aperture means for allowing the incident laser beam to pass from the output means to the focusing means, and for blocking at least a portion of a reflected beam from passing from the focusing means to the output means.

17. The system of claim 16, wherein the beam positioning means is further for maintaining substantially equal beam path lengths between the focusing means and the work surface during the scan.

* * * * *